US008211226B2

(12) United States Patent
Bredt et al.

(10) Patent No.: US 8,211,226 B2
(45) Date of Patent: Jul. 3, 2012

(54) CEMENT-BASED MATERIALS SYSTEM FOR PRODUCING FERROUS CASTINGS USING A THREE-DIMENSIONAL PRINTER

(75) Inventors: James F. Bredt, Watertown, MA (US); Michael J. Tarkanian, Brockton, MA (US); Mahati Chintapalli, Minnetonka, MN (US)

(73) Assignee: Massachusetts Institute of Technology, Cambridge, MA (US)

( * ) Notice: Subject to any disclaimer, the term of this patent is extended or adjusted under 35 U.S.C. 154(b) by 274 days.

(21) Appl. No.: 12/688,054

(22) Filed: Jan. 15, 2010

(65) Prior Publication Data

US 2011/0177188 A1 Jul. 21, 2011

(51) Int. Cl.
*C04B 7/00* (2006.01)
*C04B 7/02* (2006.01)

(52) U.S. Cl. .... 106/713; 106/705; 106/737; 106/DIG. 1

(58) Field of Classification Search ............ 106/713, 106/737, 823, 705, DIG. 1
See application file for complete search history.

(56) References Cited

U.S. PATENT DOCUMENTS

| | | | | |
|---|---|---|---|---|
| 1,951,691 A * | 3/1934 | Coxon | ............... | 106/680 |
| 2,081,802 A * | 5/1937 | Eklund | ............... | 106/641 |
| 5,204,055 A | 4/1993 | Sachs et al. | | |
| 5,342,445 A * | 8/1994 | Kiyomoto et al. | ............ | 106/789 |
| 5,851,465 A | 12/1998 | Bredt | | |
| 7,087,109 B2 | 8/2006 | Bredt et al. | | |
| 7,442,249 B2 * | 10/2008 | Mueller | ............... | 106/737 |
| 2007/0056477 A1 * | 3/2007 | Mueller | ............... | 106/721 |
| 2007/0241482 A1 * | 10/2007 | Giller et al. | ............... | 264/494 |

FOREIGN PATENT DOCUMENTS

| | | |
|---|---|---|
| EP | 1268165 B1 | 10/2004 |
| WO | 9942421 | 8/1999 |
| WO | 0178969 | 10/2001 |
| WO | 0196048 | 12/2001 |
| WO | 2008086033 | 7/2008 |

OTHER PUBLICATIONS

Beeley, Peter R. et al., Foundry Technology, pp. 158-164,168, 353, 451,1972, Wiley, Woburn, MA.
Heine, Richard W. et al., Principles of Metal Casting, 1955, McGraw-Hill, pp. 28-29, New York, New York.
Cubberly, W. H. et al., Tool and Manufacturing Engineers Handbook, 1989, Society of Manufacturing Engineers, Dearborn, Michigan.
Bredt, James et al., Binder Stability and Powder/Binder Interaction in Three Dimensional Printing, 1995, Cambridge, MA.
The International Search Report and Written Opinion issued in connection with international Patent Application No. PCT/US2010/057143 mailed on May 10, 2011.
Rabbii Ahmad, "Sodium Silicate Glass as an Inorganic Binder in Foundry Industry", Iranian Polymer Journal, Iranian Polymer Journal, Tehran, IR, vol. 10, No. 4, May 1, 2001, pp. 229-235.
Beaudoin R et al., "Direct Shell Sand Rapid Prototyping: From CAD to Casting in Days", Modern Casting, American Foundry Society, Schaumburg, IL, US, vol. 87, No. 11, Nov. 1, 1997, pp. 35-38.
Sachs E et al., "CAD-Casting: Direct Fabrication of Ceramic Shells and Cores by Three Dimensional Printing", Manufacturing Review, American Society of Mechanical Engineers, New York, US, vol. 5, No. 2, Jun. 1, 1992, pp. 117-126.
Levy et al., "Rapid Manufacturing and Rapid Tooling with Layer Manufacturing (LM) Technologies, State of the Art and Future Perspectives", CIRP Annals, Elsevier BV, NL, CH, FR, vol. 52, No. 2, Jan. 1, 2003, pp. 589-609.
Tang Hwa-Hsing et al., "Development of Rapid Prototyping System for Ceramic Shell Mold of Precision Casting", Mechatronics, 2005. ICM 2005. IEEE International Conference on Taipei, Taiwan Jul. 10-12, 2005, Piscataway, NJ, USA, IEEE, US Jul. 10, 2005, pp. 483-486.
Hsiao-Chuan Yen et al., "Developing a paving system for fabricating ultra-thin layers in ceramic laser rapid prototyping", The International Journal of Advanced Manufacturing Technology, Springer, Berlin, DE, vol. 36, No. 3-4, Apr. 18, 2007, pp. 280-287.
Yan Y et al., "Rapid Prototyping and Manufacturing Technology: Principle, Representative Technics, Applications, and Development Trends", Tsinghua Science and Technology, Tsignhua University Press, Beijing, CN, vol. 14, Jun. 1, 2009, pp. 1-12.
Kruth et al,, "Progress in Additive Manufacturing and Rapid Prototyping", CIRP Annals, Elsevier BV, NL, CH, FR, vol. 47, No. 2, Jan. 1, 1998, pp. 525-540.

\* cited by examiner

*Primary Examiner* — Paul Marcantoni

(74) *Attorney, Agent, or Firm* — Sam Pasternack; MIT's Technology Licensing Office

(57) ABSTRACT

Mixture for use in a three-dimensional printer to make molds suitable for producing ferrous coatings. The mixture includes cement, sand and accelerator. Grain sizes of the cement, sand and accelerator are selected to assure that the three-dimensional printer generates coherent layers.

19 Claims, No Drawings

CEMENT-BASED MATERIALS SYSTEM FOR PRODUCING FERROUS CASTINGS USING A THREE-DIMENSIONAL PRINTER

FIELD OF INVENTION

This invention relates to a mixture suitable for three-dimensional printer fabrication of molds and cores suitable for ferrous casting.

BACKGROUND OF THE INVENTION

Three-dimensional printing, developed at the Massachusetts Institute of Technology in the early 1990s is a versatile and useful process for creating a wide variety of structures for engineers and designers. See, U.S. Pat. No. 5,204,055. All of the references cited herein are incorporated by reference.

The three-dimensional printing method, as practiced by Z Corporation in their line of products, provides a supply of dry, granular material (hereinafter referred to as "powder") in a sequence of thin layers from one source; and a printed pattern of a liquid reaction medium (hereinafter referred to as "binder") from another source. The powder is formed into a flat layer by a mechanism, preferably a counter-rotating roller. The binder is dispensed most usually by an inkjet printhead. Chemical reactants incorporated in the powder are stable in the dry mixture until the liquid binder is added locally to a particular volume of the powder. The liquid binder provides a reaction medium and, optionally, additional reactants to the system.

In the operation of a three-dimensional printer, a layer of dry powder is first spread over a pre-existing surface. This layer generally ranges from about 50 microns to about 250 microns in thickness. After the layer is spread, an ink-jet printhead deposits a patterned dose of liquid binder over the surface. The pattern coincides with a cross-section of a desired object. The liquid binder infiltrates the powder and initiates a chemical reaction that results in the cementation, or bonding, of the granular material into a solid structure. The structure becomes bonded to any previously existing structure by migration of the liquid binder through the top layer of powder to meet bonded material in the layer immediately below. Following the formation of a given layer, the spreading mechanism deposits a further layer of powder over and in contact with the previous one, a subsequent pattern of liquid binder is dispensed, and the process is repeated until a finished article is constructed as the union of many layers bonded vertically.

The granular powdered material forms the bulk of the finished article. Portions of the liquid component may be incorporated chemically into the finished article, but it generally comprises a very small fraction of the total mass. The physical properties of the finished article are primarily determined by the nature of the granular feedstock. Refractory materials have been selected as the powder component in the instant invention to provide tolerance to high temperatures required during casting of ferrous alloys.

Dry powder remains in regions surrounding the regions moistened with liquid binder. Although it is technically not solid, these portions of loose, unbonded powder comprise a temporary fixture for the solidified material during intermediate stages of construction. The friction characteristics of the loose powder must be chosen to ensure a proper degree of mechanical support, otherwise the forces applied during layer definition can cause undesired movement and distortion.

One of the earliest applications for three-dimensional printing was the direct production of ceramic molds for metal casting, especially for high-temperature metals used in the aerospace industry. See, Bredt, J., "Binder Stability and Powder\Binder Interaction in Three Dimensional Printing," Ph.D. dissertation M. E. 1995, M.I.T., Cambridge, Mass. Ingo Ederer developed both a three-dimensional printer and a materials system for creating resin-bonded sand molds. See, European Patent No. 1,268,165. These molds were compatible with ferrous casting techniques. The ZPrinter® product line developed and sold by Z Corporation of Burlington, Mass. has proven to be a versatile and reliable platform for a variety of rapid prototyping techniques and Z Corporation developed a materials set for building molds for non-ferrous metals, and a second system for ferrous metal casting. See, U.S. Pat. No. 7,087,109. However, the ferrous casting systems have not yet been marketed successfully.

This prior art suffered from limitations that prevented them from becoming widely used. In the case of the early development of three-dimensional printing at MIT, the MIT process required the printing engine to dispense a heavily loaded suspension of colloidal silica, and suffered from severe printhead reliability problems as a result. The process was commercialized by Soligen Tech in the 1990's but it was not successful due to hardware maintenance problems stemming from handling the colloidal silica. Ingo Ederer's system used a liquid catalyst solution of either methanesulfonic acid (MSA) or sulfuric acid, and required specialized printing hardware to utilize. In the Z Corporation case for casting non-ferrous metals, the casting material was based on gypsum and is therefore unsuitable for use at the higher temperatures required for casting iron and steel.

In the case of the Z Corporation materials system for ferrous casting all three of the previous limitations were overcome, but the material formulation required the addition of a small, but significant, amount of organic adhesive in order to achieve the necessary green strength in its as-printed state. This organic material was a source of pernicious smoke during the subsequent baking and casting steps, and it severely limited the market potential of the product.

SUMMARY OF THE INVENTION

In one aspect, the invention is a material mixture for use in a three-dimensional printer to make molds suitable for producing ferrous castings. The mixture includes a cement, a sand, and an accelerator wherein grain sizes of the cement, sand and accelerator are selected to assure a coherent layer is formed, and proper solidification of the mixture is obtained. In a preferred embodiment, the cement is selected from the group consisting of Portland cement, lime-rich pozzolan, and class F fly ash. The cement may include hot lime, cement grade magnesium oxide or reactive alkaline oxides. The reactive alkaline oxides are provided by CaO—, MgO— or ZnO— containing materials.

In another preferred embodiment, the sand is selected from the group consisting of crystalline silica, olivine, chromite, zircon, alumina, mullite, fused silica and chamotte. In a preferred embodiment, the accelerator is a water-soluble silicate. It is preferred that the water-soluble silicate be selected from the group consisting of sodium metasilicate, lithium metasilicate, potassium metasilicate, condensed water-soluble polysilicates and water-soluble high-alkali glasses.

In a preferred embodiment, each of the three components separately has a fairly uniform grain-size. The sand is comprised of grains that are relatively larger than the other components, and the cement is comprised of grains that are relatively finer than the other components. Since different alternative materials possess different bulk densities, it is convenient to specify generalized compositions in terms of the bulk volume of each separate component, before mixing. The process of mixing disposes the finer grains into the spaces between the larger grains, so generally the mixture has a smaller volume than the sum of the volumes of each component before mixing. The volume fraction occupied by each component in a finished mixture is not so well defined, and therefore it is convenient to address the composition in one of two ways: as volume fractions of components before they are mixed, or as the mass fractions of the specific individual components.

In a preferred embodiment, the mixture includes sand in the volumetric range of 5-50%; sodium silicate in the range of 1-50% and the remainder being element. In a further preferred embodiment, sand is in the range of 10-35%, sodium silicate is in the range of 5-35% and the remainder is cement. In yet another embodiment, the mixture includes approximately 60% by volume of fine Portland cement; approximately 20% by volume of 60 mash silica sand; and approximately 20% by volume of dry powdered sodium metasilicate, 100 mesh. Expressed as weight percentages, the preferred recipe is approximately 60% cement; 25% silica sand; and 15% sodium metasilicate. In another preferred embodiment, 150 mesh zircon sand replaces at least a portion of the silica sand to provide higher strength and better accuracy of the resulting mold.

In still another embodiment, the mixture disclosed herein includes particles having sizes in the range of 75-300 μm, 25-75 μm and below 25 μm. It is preferred that approximately one third of the bulk volume of the mixture comprises particles in the size range of 75-300 μm; one third in the size range of 25-75 μm and the remainder of the mixture has particle size 25 μm and below. Further, it is most highly desired that the adhesive or cementitious components comprise the finest particles, while the insoluble, structural components comprise the coarsest particles. Soluble and chemically reactive particles may be chosen in any size range, particularly if grain-size is used to control reaction kinetics.

In a further preferred embodiment, the volume-averaged distribution of grain sizes should be centered about a median of approximately 50 microns. When coarser sand is replaced by finer sand, e.g. 150 mesh zircon replacing 60 mesh silica, it becomes necessary to reduce the fraction of fine particles to compensate for the flow characteristics of the finer sand. Therefore, reducing the mean grain size of the sand by half requires that the cement fraction similarly be reduced by half. A preferred embodiment containing 150-mesh zircon sand replacing the silica component has the volumetric ratios of approximately 40% zircon; 45% cement; and 20% sodium metasilicate. The corresponding mass fractions are approximately 60% zircon; 30% cement; and 10% sodium metasilicate.

During three-dimensional printing, the mixture further includes an aqueous liquid binder, such as water; water containing a surfactant; or aqueous stock binder appropriate to the three-dimensional printing hardware in use. In yet another embodiment, the components of the mixture are selected so that solidification occurs in a time range of approximately thirty seconds to five minutes after the article has been printed.

The invention disclosed and claimed herein overcomes the limitations discussed earlier in the prior art. Using an unmodified, standard printing engine (for example, a ZPrinter® printing stock binder) the chemical specialization of the printer is unnecessary. By using siliceous cement, the thermal tolerance of the material is sufficient for ferrous casting. By incorporating a highly effective inorganic accelerator, the material develops sufficient green strength to be handled immediately without requiring the use of an organic adhesive.

Mold components made according to the invention on a standard ZPrinter® may be removed immediately after they are built, treated with any suitable mold wash (aqueous or non-aqueous) and rapidly baked dried without distortion, cracking or smoke evolution. The drying temperature need only be high enough to remove moisture from the part. Following drying, the material has been successfully used to cast gray iron at 1400° C., and service for steel at 1700° C. is expected to be accomplished with little or no difficulty, particularly when the mold component contains a high fraction of zircon.

DESCRIPTION OF THE PREFERRED EMBODIMENT

The mixture of the present invention comprises three components, generically a cement, a sand and an accelerator. A currently preferred embodiment is a mixture of 60% by weight of fine Portland cement; 25% by weight of 60 mesh silica sand; and 15% by weight of dry powdered sodium metasilicate, 100 mesh. Another preferred embodiment uses 150 mesh zircon sand to provide better printing accuracy and even higher temperature tolerance. It is preferred that the volume fraction (before mixing) of sand be in the range of 5-50% with a more preferred range of from 20-50%. Sodium silicate should be in the range of 1-50% with a more preferred range of from 5-35%. Cement makes up the remainder.

An alternative cement material is a lime-rich pozzolan, especially class F fly ash. It is the view of the inventors herein that the reaction between lime and silicate in the mixture produces rapid hardening. Accordingly, other alternative cement components include hot lime, cement grade magnesium oxide, and alkaline CaO—, MgO— or ZnO— containing materials to provide reactive alkaline oxides that react with sodium metasilicate.

Alternative sands suitable for use in the present invention are any of the variety currently used in the foundry industry of which crystalline silica, olivine, chromite, zircon, alumina, mullite, fused silica and chamotte are the most well-known examples. Alternative accelerators include any soluble metasilicates such as sodium, lithium, potassium, etc. More highly condensed polysilicates are also suitable so long as they are soluble in water, and glass compositions may be used that contain enough alkalai to render them water-soluble.

The mixture of the invention has features that enable industrially useful objects to be fabricated on a three-dimensional printer. Two of the most important of these features are the ability for the three-dimensional printing hardware to form a uniform layer of loose powder without distorting the underlying layers, and the ability for a printed binder-powder mixture to solidify and strengthen within a window of time without any agitation.

A detailed analysis of powder flow in three-dimensional printing is found in United States published application U.S. 2007/0241482 to Giller et al. This analysis leads to a quantitative limitation on the frictional properties of the powder mixture that must be satisfied to enable the present invention. The contents of U.S. 2007/0241482 are incorporated herein in their entirety by reference. In brief terms, a powder mixture suitable for use in a three-dimensional printer must possess a frictional quality such that the friction between powder grains at rest is greater than the friction between powder grains in a state of flow by a substantial margin.

The coefficient of friction for a non-cohesive powder may be expressed as the tangent of the angle of repose of a conical pile. An approximate value for friction coefficients may be measured first on a conical pile of material built under static conditions, then jarring the pile with brief mechanical vibration and measuring the slope after the pile has come to rest. The ratio between the observed slopes provides an approximate measure of the ratio between static and dynamic friction coefficients. In practice, it has been found that static friction must be at least 25% larger in magnitude than the dynamic friction. A measurement of the preferred composition yielded values of 1.07 for the static slope and 0.71 for the dynamic slope, a difference of about 50%.

The mechanical requirements to enable formation of coherent layers are most conveniently satisfied by choosing a correct distribution of grain sizes in the inventive mixture. The refractory mixture in the instant invention includes some relatively coarse sand to provide structure and gas permeability in the finished mold component. To effect good spreading, the grain size distribution must be relatively broad in order to lubricate the motion of the coarse sand particles. In a preferred embodiment, approximately one-third of the bulk volume of the mixture is approximately 75-300 μm in size; one third is in the range of 25-75 μm; and the remainder is below 25 μm. Virtually all of the fraction below 25 microns is the cement component, which seems to reduce the friction of the powder when it is in motion. In another preferred embodiment, the volumetrically weighted grain size distribution is centered about a median of 50 microns.

Another important factor that influences friction and spreading in powders is the moisture content. In practice, a developer would choose ingredients that do not take up a great deal of moisture when exposed to air. The materials recited above appear to conform to this rule, although Portland cement will react slowly if it is left in the air for a long time. In practice, however, the mixtures in the preferred embodiment may be cycled in a 3D Printer many times over several weeks without noticeably degrading in performance.

A reaction rate requirement among the components of the mixture to enable three-dimensional printing is fairly strict. A binder-infused portion of material on a 3D Printer must be substantially solid before significant evaporation has occurred. Otherwise, capillary stresses will lead to warping or cracking of the object, with detrimental effects on part accuracy. On the other hand, the uptake of water in any solidification reaction must be slow enough to allow the liquid binder to migrate between printed features, especially stripe-to-stripe (in the context of inkjet printing with a multi-jet printhead) and layer-to-layer, in order for the printed object to knit together into a solid. A suitable binder is predominantly water with a small quantity of surfactant to ensure sufficient (but not excessive) spreading of the liquid through the pore space in the powder. Other ingredients may be required in the binder to achieve peak performance in the printing apparatus, but do not participate in the capillary migration or subsequent reaction and solidification of the powder.

It is preferred that solidification occur in a time greater than about 30 seconds, but less than about five minutes. The choice of reagents in the solidification mechanism (cement plus accelerator) is the primary control over this reaction rate, but some measure of fine control is obtained by selecting the grain size distribution of the ingredients. Cement that is chosen with the finest grain-size in the mixture becomes evenly distributed throughout the pores between the larger grains. By using a relatively coarse (100-150 micron) powder of sodium metasilicate, the reaction between this very potent accelerator and most of the cement is delayed. Early in the dissolution period, silicate anions in solution are localized near the larger sodium metasilicate grains. Following this, the silicate anions diffuse across the distance separating the original coarse grains to react with the bulk of the cement in the required time window.

The discovery and incorporation of the correct grain size distribution and frictional properties of the mixture are important aspects of the present invention. Without the mechanical and kinetic properties incorporated in the recipe disclosed herein, the mixture would fail in one or more very frequently observed ways.

The candidate materials for the formulation of this invention are known in the history of foundry technology. Although Portland cement and sodium metasilicate appear to have historically been used in separate formulations they were not mixed together. For example, see P. W. Beeley, *Foundry Technology* (1972) p.451, where both Portland cement and sodium silicate are described as alternative cementing agents for investment casting, but not in combination with each other. Sodium metasilicate is a well-known strengthening additive for concrete in construction applications, although the quantity used in the instant invention vastly exceeds a useful percentage for concrete. The high concentration of sodium metasilicate is required in the instant invention because mechanical agitation of the binder-powder mixture is not possible in a 3D Printer. By contrast, mechanical mixing of cement slurry in construction is always required.

In another embodiment, this invention comprises an article manufactured using the above-described mixtures. Molds, mold components, and cores used for metal casting may be fabricated on a conventional three-dimensional printer, subjected to a drying heat treatment, and may be incorporated into a mold for forming a casting in a variety of metals, including, but not limited to, gray iron and steel.

In another embodiment, this invention comprises a method for fabricating molds, mold components, and cores. The mixtures described above may be combined with an aqueous liquid including, but not limited to, water and a surfactant in a stepwise manner in a layer-based fabrication machine such as a 3D Printer as manufactured by Z Corporation. Following the completion of the fabrication, the molds and mold components may be dried in an oven and presented to a stream of molten metal including, but not limited to, gray iron and steel, to form a metal casting.

It is recognized that modifications and variations of the invention disclosed herein will be apparent to those of ordinary skill in the art, and all such modifications and variations are included within the scope of the appended claims.

What is claimed is:

1. A mixture for use in a three-dimensional printer to make molds suitable for producing ferrous castings comprising:
    a cement;
    a sand; and
    an accelerator wherein grain sizes of the cement, sand and accelerator are selected so that approximately one-third of the bulk volume of the mixture comprises particles in the size range of 75-300 μm; approximately one-third in the size range of 25-75 μm, and approximately one-third in the size range of 25 μm and below.

2. The mixture of claim 1 wherein the cement is selected from the group consisting of Portland cement, pozzolan and class F fly ash.

3. The mixture of claim 1 wherein the cement includes lime, magnesium oxide or alkaline earth oxides.

4. The mixture of claim 3 wherein the alkaline earth oxides are selected from the group consisting of CaO—, MgO—, or ZnO-containing materials.

5. The mixture of claim 1 wherein the sand is selected from the group consisting of crystalline silica, olivine, chromite, zircon, alumina, mullite, fused silica and chamotte.

6. The mixture of claim 1 wherein the accelerator is water soluble silicate.

7. The mixture of claim 6 wherein the soluble silicate is selected from the group consisting of sodium metasilicate, lithium metasilicate, potassium metasilicate, condensed water-soluble polysilicates and water soluble glasses.

8. The mixture of claim 1 comprising sand in the volumetric range of 5-50%; sodium silicate in the range of 1-50%, and the remainder being cement.

9. The mixture of claim 8 comprising sand in the range of 10-35%; sodium silicate in the range of 5-35%, and the remainder being cement.

10. The mixture of claim 1 comprising approximately 60% by volume of fine Portland cement; approximately 20% by volume of 60 mesh silica sand; and approximately 20% by volume of dry powdered sodium metasilicate, 100 mesh.

11. The mixture of claim 1 including particles having sizes in the range of 75-300 μm, 25-75 μm, and below 25 μm.

12. The mixture of claim 1 further including an aqueous liquid binder.

13. The mixture of claim 1 comprising approximately 60% by weight cement, 25% by weight of silica sand, and 15% by weight of sodium metasilicate.

14. The mixture of claim 5 wherein 150 mesh zircon replaces at least a portion of the silica sand.

15. The mixture of claim 1 wherein sand particles are larger than cement and accelerator particles and wherein the cement particles are finer than the accelerator particles.

16. The mixture of claim 1 wherein volume averaged distribution of grain sizes is centered around a median of approximately 50 μm.

17. The mixture of claim 1 including approximately 40% by volume of 150 mesh zircon, 45% by volume of cement and 20% by volume of sodium metasilicate.

18. The mixture of claim 1 including approximately 60% by weight of 150 mesh zircon, approximately 30% by weight of cement and approximately 10% by weight of sodium metasilicate.

19. The mixture of claim 12 wherein the aqueous liquid binder is selected from the group consisting of water, and water containing a surfactant.

* * * * *